United States Patent
Wilson

[15] 3,684,819
[45] Aug. 15, 1972

[54] SEALING BOOT FOR AN ELECTRICAL RECEPTACLE

[72] Inventor: Ronald G. Wilson, 207 Colfax, Cadillac, Mich. 49601

[22] Filed: Feb. 25, 1971

[21] Appl. No.: 118,915

[52] U.S. Cl. ............... 174/53, 174/138 F, 200/168 G
[51] Int. Cl. .............................................. H02g 3/08
[58] Field of Search ......... 174/50, 53, 66, 67, 138 F; 200/168 D, 168 F, 168 G; 220/3.8, 88, 27, 24.2, 24.3

[56] References Cited

UNITED STATES PATENTS

| | | |
|---|---|---|
| 3,246,112 | 4/1966 | Adams et al. .......... 200/168 G |
| 2,345,757 | 4/1944 | Lester .................... 200/168 G |
| 3,236,990 | 2/1966 | Bates ...................... 200/168 G |
| 2,908,418 | 10/1959 | Gallay ....................... 220/27 |

FOREIGN PATENTS OR APPLICATIONS

| | | |
|---|---|---|
| 218,348 | 6/1924 | Great Britain ............. 174/5 R |
| 409,090 | 4/1934 | Great Britain ............. 220/3.8 |

*Primary Examiner*—Lewis H. Myers
*Assistant Examiner*—D. A. Tone
*Attorney*—Gordon W. Hueschen and Talivaldis Cepuritis

[57] ABSTRACT

A flexible boot for an electrical receptacle having an open end and a closed end, and a peripheral, outwardly-extending, resilient flange which depends from the open end. The closed end of the boot is provided with areas of reduced thickness which are adapted to be pierced by electrical leads connected to the receptacle. The boot is employed in combination with an electrical outlet box and a receptacle situated therein so that the receptacle is surrounded by the boot and the resilient flange of the boot is held between the outer rim of the outlet box and a flange on the receptacle in a sealing relationship.

4 Claims, 3 Drawing Figures

PATENTED AUG 15 1972 3,684,819
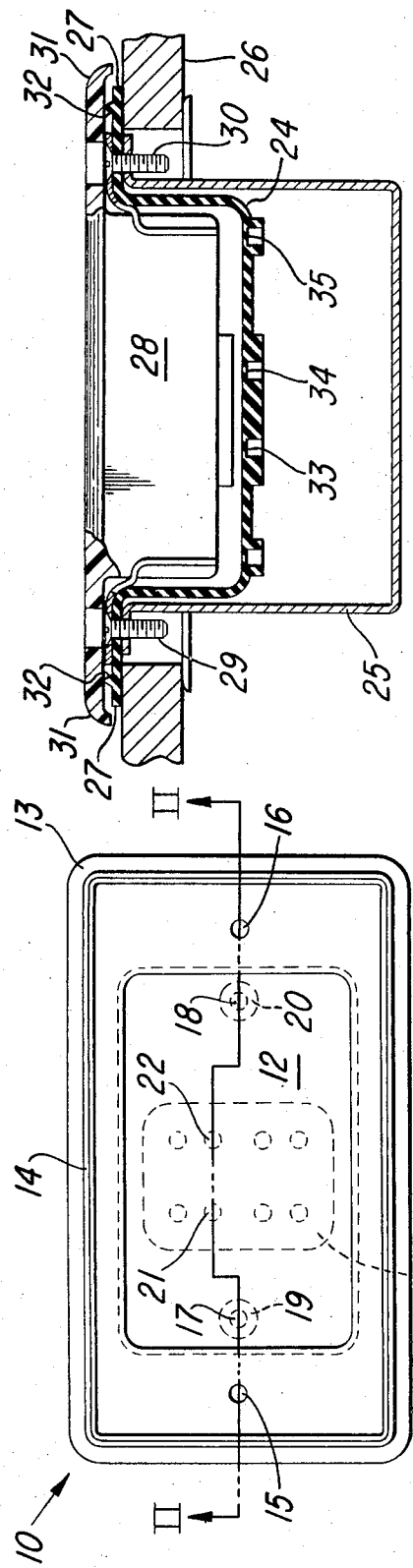
figure 1
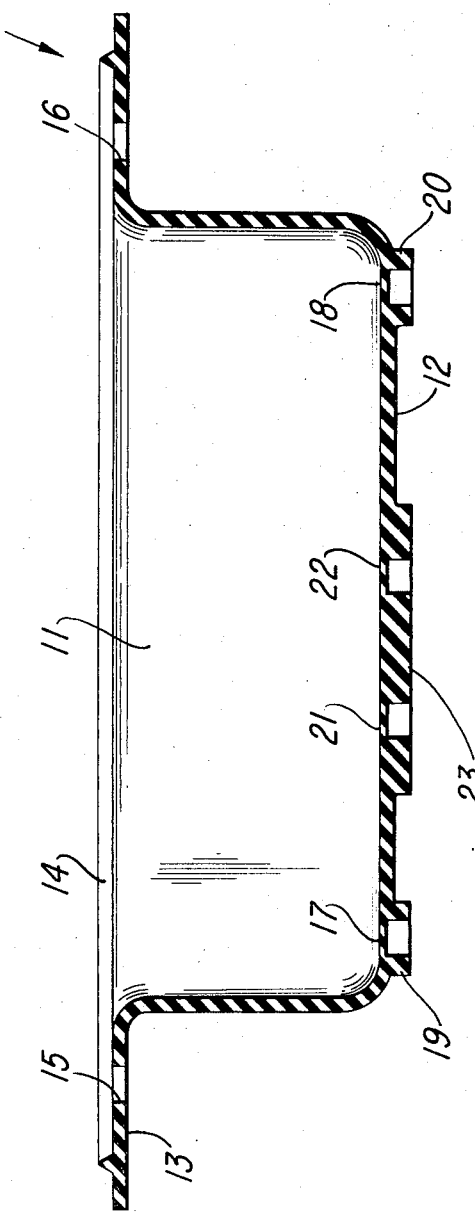
figure 3
figure 2
INVENTOR.
RONALD G. WILSON
BY
ATTORNEY

SEALING BOOT FOR AN ELECTRICAL RECEPTACLE

BACKGROUND OF THE INVENTION

This invention relates to sealing means for electrical outlets or receptacles.

In mobile homes, motor homes, boats, and even conventional homes a problem is encountered with outside electrical outlets or receptacles in that gaps permitting cold air to enter the dwelling space remain after installation. It is an object of the present invention to provide a means for effectively sealing such outlets or receptacles. Still other objects will readily present themselves to one skilled in the art upon reference to the ensuing specification, the drawings, and the claims.

SUMMARY OF THE INVENTION

The present invention contemplates a flexible boot for an electrical outlet or receptacle and having an open end and a closed end. A peripheral, outwardly-extending, resilient flange depends from the open end of the boot and the closed end of the boot is provided with areas of reduced thickness which are adapted to be pierced by electrical leads connected to the receptacle. In a preferred embodiment, the resilient flange is provided with a sealing rib. The boot is preferably made of a dielectric material, more preferably the boot is molded from rubber.

The flexible boot is utilized in combination with an electrical outlet box and a receptacle situated therein. The boot surrounds that portion of the receptacle within the box, and the resilient peripheral flange of the boot extends over the outer rim of the outlet box. Preferably the receptacle is provided with an outer flange. In such event the resilient peripheral flange of the boot is held in a sealing engagement between the outer rim of the box and the outer flange of the receptacle. Alternatively, a seal can be obtained by means of a receptacle face plate which presses the resilient flange against the outer rim of the outlet box.

BRIEF DESCRIPTION OF THE DRAWINGS

In the drawings,

FIG. 1 is a top view of a sealing boot of this invention;

FIG. 2 is a sectional elevation of the boot shown in FIG. 1 taken along line II—II; and FIG. 3 is a partial sectional elevation of another sealing boot of this invention shown in combination with an outlet box and a receptacle situated therein.

DESCRIPTION OF PREFERRED EMBODIMENTS

Referring to FIGS. 1 and 2, flexible boot 10 is made of a dielectric material such as molded rubber and is provided with open end 11 and closed end 12. Outwardly-extending, resilient flange 13 depends from open end 11 and surrounds the periphery thereof. Flange 13 can also be provided with sealing rib 14 on the face thereof which rib is adapted to sealingly engage an outer flange or a faceplate of a receptacle. Openings 15 and 16 in flange 13 are provided to facilitate the mounting of a receptacle in a conventional electrical outlet box as will be discussed in more detail hereinbelow. Areas of reduced thickness 17 and 18 are provided in bosses 19 and 20, respectively, as well as similar areas such as 21 and 22 provided in boss 23.

Referring to FIG. 3, flexible boot 24 is situated within conventional electrical outlet box 25 mounted in wall 26. Resilient flange 27 extends over and sealingly engages outer rim of box 25. Receptacle 28 is situated inside boot 24 and is mounted in box 25 by means of screws 29 and 30. In the embodiment shown, outer flange 31 of receptacle 28 sealingly engages sealing rib 32 by pressing thereagainst. Similar sealing engagement can also be effected with a receptacle faceplate. Areas of reduced thickness 33, 34 and 35 in boot 24 are adapted to be pierced by electrical leads (not shown) to be connected to receptacle 28.

The sealing boot can be manufactured from any material sufficiently flexible to effect the desired seal. E or electrical installations a dielectric material such as natural rubber, synthetic rubber, e.g., neoprene, silicone rubber, styrene-butadiene rubber, various elastomeric resins, e.g., fluorocarbon resins, polyacrylates, polyurethanes, and the like, are preferred. From the standpoint of its dielectric properties, cost, and ease of manufacture, moldable rubber is particularly preferred.

In a typical installation, electrical leads are first pierced through the weakened areas of the boot and connected to a desired receptacle. Thereafter the boot is drawn over the receptacle and the resulting assembly suitably mounted in an outlet box.

The foregoing discussion and the accompanying drawings are intended as illustrative but are not to be construed as limiting. Still other variations within the spirit and scope of this invention will readily present themselves to one skilled in the art.

I claim:

1. In combination, an electrical outlet box; a flexible boot having an open end and a closed end, and a peripheral, outwardly-extending, resilient flange depending from the open end situated within the outlet box so that the resilient flange extends over outer rim of the outlet box; and an electrical receptacle situated within said boot and affixed to said outlet box; the closed end of said flexible boot being provided with areas of reduced thickness which are pierced by electrical leads connected to the receptacle, and the resilient flange of said boot sealingly engaging said outer rim.

2. The combination in accordance with claim 1 where in the resilient flange is provided with an annular sealing rib on the face thereof, adapted to sealingly engage an outer flange or face plate of said receptacle.

3. The combination in accordance with claim 1 where in the flexible boot is made of a dielectric material.

4. The combination in accordance with claim 3 wherein the material is molded rubber.

* * * * *